(12) United States Patent
Paice

(10) Patent No.: US 7,233,506 B1
(45) Date of Patent: Jun. 19, 2007

(54) LOW KVA/KW TRANSFORMERS FOR AC TO DC MULTIPULSE CONVERTERS

(76) Inventor: Derek Albert Paice, 114 Rosewood Ct., Palm Harbor, FL (US) 34685

(*) Notice: Subject to any disclaimer, the term of this patent is extended or adjusted under 35 U.S.C. 154(b) by 0 days.

(21) Appl. No.: 11/395,750

(22) Filed: Apr. 3, 2006

(51) Int. Cl.
*H02M 7/155* (2006.01)

(52) U.S. Cl. ........................... 363/45; 363/129

(58) Field of Classification Search .................... 363/3, 363/5, 39, 44, 45, 64, 67, 69, 70, 126, 129
See application file for complete search history.

(56) References Cited

U.S. PATENT DOCUMENTS

| | | | |
|---|---|---|---|
| 4,255,784 A * | 3/1981 | Rosa .......................... | 363/129 |
| 4,876,634 A * | 10/1989 | Paice ........................ | 363/5 |
| 5,124,904 A * | 6/1992 | Paice ........................ | 363/3 |
| 5,619,407 A * | 4/1997 | Hammond ................... | 363/155 |
| 6,101,113 A * | 8/2000 | Paice ........................ | 363/126 |
| 6,191,968 B1 * | 2/2001 | Paice ........................ | 363/148 |
| 6,335,872 B1 * | 1/2002 | Zhou et al. ................. | 363/154 |
| 6,525,951 B1 * | 2/2003 | Paice ........................ | 363/154 |
| 6,950,322 B2 * | 9/2005 | Ferens ........................ | 363/44 |
| 6,982,884 B1 * | 1/2006 | Paice ........................ | 363/44 |

\* cited by examiner

*Primary Examiner*—Adolf Berhane (57) ABSTRACT

A polygon connected autotransformer in conjunction with zero sequence blocking inductor(s) enables multipulse AC to DC converters to use lower kVA parts rating by using appropriate phase-shifted voltage sets in conjunction with inductors that extend the conduction period and reduce rms current. Also, lower harmonic voltages in the transformer facilitate use of lower performance magnetic steel. Designs for 12, 18, and 24-pulse use the same conceptual approach. Very efficient high power ratings are feasible. Means are given to limit the maximum no-load DC output voltage. A technique is disclosed that reduces the size of polygon transformers supplying loads with substantial third harmonic.

8 Claims, 11 Drawing Sheets

LOW kVA/HP MULTIPULSE CONVERTER

FIG. 1

PRIOR ART APPLICATION OF POLYGON TRANSFORMER

FIG. 2

1:1:1: TRANSFORMER
PHASE SHIFT + - 20°

THREE, 3-PHASE BRIDGE CONVERTERS

PRIOR ART APPLICATION OF ZSBTs

FIG. 4

REPRESENTATION OF POLYGON TRANSFORMER
COILS AND SAMPLE VOLTAGE VECTORS

VIEW OF POLYGON TOP RIGHT CORNER
WHEN ADDITIONAL COIL TAPS ARE USED

FIG. 5

FROM BR#1 FIG. 3    FROM BR#2 FIG. 3

NONLINEAR MEANS TO LIMIT DC OPEN CIRCUIT VOLTAGE

FIG. 6

FROM BR#1 FIG. 3    FROM BR#2 FIG. 3

TUNED DAMPING TO LIMIT DC OPEN CIRCUIT VOLTAGE

FIG. 7

FLUX CLOSES
INSIDE CORE
FOR ALL CURRENTS

THREE COILS WOUND ON A SINGLE-PHASE CORE

FIG. 8

CALCULATED AC LINE CURRENT IN
24-PULSE CONVERTER USING ZSBIs

FIG. 9

TWO 18-PULSE CONVERTERS STAGGERED
BY 10° TO GIVE 36-PULSE OPERATION

FIG. 10

THIRD HARMONIC CURRENTS

FIG.11

POLYGON TRANSFORMER WITH ADDITIONAL DELTA

LOW KVA/KW TRANSFORMERS FOR AC TO DC MULTIPULSE CONVERTERS

FIELD OF THE INVENTION

The invention relates to static AC to DC power converters such as can be used for AC or DC motor drive systems.

References Cited
U.S. Patent Documents

| | | |
|---|---|---|
| 4,255,784 | March 1981 | Rosa |
| 4,876,634 | October 1989 | Paice |
| 5,124,904 | June 1992 | Paice |
| 5,619,407 | April 1997 | Hammond |
| 6,101,113 | August 2000 | Paice |
| 6,191,968 | February 2001 | Paice |
| 6,335,872 | January 2002 | Zhou, et. al. |

Other Publications
"Power Converter Harmonics" by Derek A. Paice, published 1995 by the IEEE Press, ISBN 0-7803-1137-X

BACKGROUND OF THE INVENTION

To meet industry needs for electrical power converters which convert AC to DC without injecting large amounts of harmonic currents into the power system, numerous transformer and converter topologies are available, some of which are described in the documents referenced above. All require installation of extra equipment and add to the total cost. Preferred methods are those which perform well in practical power systems which incorporate voltage unbalance and preexisting harmonic voltages. Methods whereby three-phase power is converted to nine-phase power before processing, have been described in U.S. Pat. Nos. 5,124,904, 5,619,407, 6,191,968, and 6,335,872. Continual improvements are sought to reduce cost, particularly in systems with lower output current. The invention described here provides for a lower cost, smaller size design.

This invention describes an improvement to an approach first described in U.S. Pat. No. 4,876,634. In this patent, m sets of three-phase AC voltage each displaced by an angle of nominally 60°/m are applied to m three-phase bridge converters that are paralleled to feed a DC load. In this patent, unwanted circulating currents are minimized by interphase transformers incorporated in the DC circuits of the paralleled converters. Interphase transformers designed with appropriate zero sequence impedance can prevent circulating currents, but they are relatively bulky. It is desirable to eliminate them. This is possible using the methods taught in the U.S. Pat. No. 5,124,904 patent.

U.S. Pat. No. 6,335,872 uses the means described in U.S. Pat. No. 5,124,904 to eliminate the interphase transformer by using a nine-phase configuration. Also, it draws on the polygon transformer described in U.S. Pat. No. 4,876,634 as a means to generate a nine-phase AC supply. Unfortunately, the full potential of this arrangement is not obtained when the polygon transformer is used to feed loads that draw significant third harmonic current, as in an 18-pulse converter fed with a nine-phase supply. The polygon transformer rating is greatly increased because of third harmonic current that circulates in the transformer coils. The invention herein eliminates that problem and results in a significantly smaller transformer.

U.S. Pat. No. 6,101,113 describes means to retain the desirable 60°/m phase shifting features without using interphase transformers. In this patent, unwanted circulating currents are limited by means of zero sequence blocking transformers included in at least m−1 of the m AC voltage sets.

The invention described here combines zero sequence blocking transformers with the polygon transformer described in U.S. Pat. No. 4,876,634. It results in multipulse converter circuits with substantially increased efficiency, reduced size, and lower cost than previously disclosed methods. Circulating harmonic currents are avoided and transformer size is greatly reduced.

In a practical 18-pulse design, the kVA of the polygon autotransformer is about 17% of the DC load kW. In a 24-pulse configuration the transformer rating is less than 11%.

The invention can also be applied with double-wound transformer configurations, as taught in the U.S. Pat. No. 4,255,784 patent. An additional coil or coils on each phase allow any voltage transformer ratio to be achieved. In this case the transformer rating is comparable to the load.

As noted previously, other auto-wound and double-wound transformer methods are available that can dispense with the interphase transformers or ZSBTs by illustratively using a nominal 120°/m phase shift as taught in U.S. Pat. No. 5,124,904. However, these circuits result in shorter current conduction angles, which increase the rms current in conductors and semiconductors. Further, because AC line reactance is invariably included before the transformer, high frequency harmonic voltages are developed across the transformers. Thus, high performance magnetic steel is often used.

The transformer used in the invention described here is operated with AC line reactors in the output leads. This feature not only increases current conduction, which reduces rms current, but also reduces harmonic voltages appearing across the transformer. Thus, the transformer is better able to use lower quality magnetic material. The net result is a much smaller transformer. For example, in an 18-pulse method the transformer of the invention has only about 40% of the rating of typical 18-pulse converters presently in use.

Because of voltage vector differences, the inherent open circuit DC output voltage of the invention is somewhat higher than that of multipulse systems in which the AC voltage sets are displaced by an angle of 120°/m. However, careful selection of the magnetizing inductance of the zero sequence blocking transformer, in conjunction with a minimum load or other means described in the invention, obviates this problem. To highlight the importance of the zero sequence magnetizing impedance the device in this invention is henceforth called ZSBI (zero sequence blocking inductor)

BRIEF SUMMARY OF THE INVENTION

A three-phase polygon transformer is arranged to provide m equal-amplitude, phase-shifted three-phase voltage sets suitable for powering m three-phase converter bridges. Zero sequence blocking inductors (ZSBIs) are included in at least (m−1) of the m voltage sets. Additional AC line reactors are included in each AC voltage set as necessary to secure a balance with any transformer leakage inductance. By these means individual currents are balanced and the expected low harmonic content is obtained in current drawn from the three-phase power source. Means are described to provide phase shifting of each polygon section such that multipulse converters can be staggered in a manner to further reduce system harmonic currents. For example, two 18-pulse converters operating on the same power system can be made to appear as a 36-pulse converter. Simple, practical methods for limiting the magnitude of the DC open circuit voltage are described.

BRIEF DESCRIPTION OF THE DRAWINGS

FIG. 2 shows the prior art of U.S. Pat. No. 6,101,113. In this example, a fork type transformer fed with power from a three-phase supply labeled A, B, C, is used to provide two additional equal amplitude three-phase voltage sets at terminals 1, 2, 3 and 4, 5, 6. These are shifted from the AC supply by nominally ±20°, respectively. In conjunction with voltages available at terminals A, B, and C, power is fed to three rectifier bridges. Two devices labeled ZSBT#1 and ZSBT#2 are zero sequence blocking transformers that provide effective isolation and minimize circulating currents. Additional impedance Z is shown in the phase not including a ZSBT. This impedance compensates for possible unbalance impedance caused by the transformer leakage impedance. The DC load voltage is smoothed by means of a filter capacitor. The nominal value of DC output voltage is 2.34 $V_{AN}$, where $V_{AN}$ is the line to neutral voltage of the three-phase power source.

Rating of the fork transformer in this configuration is relatively small, however, it can be made even smaller by using the polygon transformer as taught in U.S. Pat. No. 4,876,634, and shown in the prior art of FIG. 1. Also, means to limit the maximum DC output voltage are facilitated by deploying ZSBIs, which are designed to have an appropriate value of magnetizing inductance. This inductance is generally greater than that required for a ZSBT which focuses on maintaining proper operation with substantial load.

FIG. 3 shows a preferred embodiment of the invention applied to an 18-pulse converter. A three-phase power input source, labeled 1, 2, 3, applies power to a polygon transformer connected so as to make available two additional equal-amplitude, phase-shifted output voltage sets labeled, 1' 2' 3' and 1" 2" 3" respectively. AC line inductors labeled L1 through L9 are connected in series with the transformer outputs to balance and if necessary augment transformer leakage inductance so as to reduce circulating currents and extend the current conduction period. Output voltage sets labeled 1' 2' 3' and 1" 2" 3" are fed through zero sequence blocking inductors, ZSBI#1 and ZSBI#2, respectively. These components block third harmonic voltages and ensure proper 18-pulse operation. In combination with the power source, appropriately phase shifted voltages are applied to three converter bridges labeled BR#1, BR#2, and BR#3. To secure 18-pulse operation, voltages 1' 2', 3' and 1", 2", 3" are shifted by nominally ±20° from the power source 1, 2, 3. The terminals of converter BR#1 and BR#2 are labeled A1, B1, C1, and A2, B2, C2, respectively. The converters are shown with rectifier diodes, but they could equally well be shown as phase controlled rectifiers without altering the basic performance of the invention.

The polygon transformer is represented as an auto-connection, but it will be obvious to those skilled in the art that the polygon could simply be the secondary coils of a double-wound transformer with power applied to isolated primary coils. By this means, any step up or step down voltage ratio is feasible, also multipulse converter equipments are readily staggered so as to present even lower harmonic currents to the power system. In a double-wound connection, the transformer rating will be slightly in excess of that of the load.

As an auto-connection for 18-pulse operation the transformer has a practical rating that is about 17% of the DC load kW. Practical zero sequence blocking inductors ZSBI#1 and ZSBI#2 are such that for DC loads greater than about 0.3% of full load, the DC output voltage will not be greater than that obtained with popular 18-pulse converters using ±40° phase-shifted voltages.

Vector, $V_{D-N}$, in FIG. 4 is an example of an output voltage lagging the input line-to-neutral voltage $V_{A-N}$ by an angle of $\phi°$. For an 18-pulse converter connection, output voltages such as $V_{D-N}$ would be of the same amplitude as $V_{A-N}$, and $\phi$ would be nominally 20°. However, it is noted that the polygon is capable of supplying a wide range of phase shifts up to 60°. Thus, other phase shift angles are possible. These may be preferred for other connections.

For a 12-pulse method, angle $\phi$ is 15°. For a 24-pulse method an additional tapping can be used on the X coil such that it comprises turns X1 and X2 as shown in the lower part of FIG. 4. If the phase angles $\phi_1$ and $\phi_2$ are set to provide phase shifts of 7.5° and 22.5°, respectively, four three-phase voltage sets sequentially separated by 15° are obtained. These voltages are suitable for a 24 pulse converter.

FIG. 5 shows a very small auxiliary converter with input terminals A1, B1, C1, and A2, B2, C2, and nonlinear DC load. This auxiliary converter is connected to the main converter bridges, BR#1 and BR#2 in FIG. 3. It provides means to limit the maximum open circuit DC output voltage of the main converter when the AC line voltage is at its highest value within the design range. In some applications this feature may be desirable. This is because when a phase shift of 60°/m is used, the inherent DC open circuit voltage of the converter is determined by vectors at angles other than the usual 120°. For example, with a 20° phase shift and assuming a line-to-neutral voltage of unity, the maximum AC line-to-line voltage is $1\angle20°-1\angle-140°$. This vector has an amplitude of 1.9696; it is 13.7% higher than expected for a normal-three-phase bridge converter.

A non exhaustive list of ways to limit the DC open circuit voltage, includes:

1. Ensure a minimum converter load of about 0.3%.

2. Increase the impedance of the ZSBI at low current loads.

3. Use switching means to effectively isolate one or more of the phase-shifted bridges at low current.

When fundamental currents are phase shifted by 40°, the corresponding third harmonic currents are shifted by 120°. Nine third harmonic currents labeled i1 through i9 are shown in FIG. 10. If the amplitude of these harmonic currents is $I_3$, then it can be shown that the circulating current ia has an amplitude of 2.88 $I_3$, when the polygon is fed at the points where i1, i4, and i7 emanate. Other currents are readily calculated using the vector algebra. The net effect is that the transformer size is significantly increased.

FIG. 11 shows an extra coil with turns W added to the basic polygon containing turns X, Y, and Z. Coil W provides a path for circulating third harmonic currents and permits a significant reduction in transformer size. The combination of turns must be chosen so as to limit the amount of circulating current at fundamental frequency, for example, W=235, Z=94, X=67, and Y=37 gives useful results. Because the performance is affected by coil impedances and coupling factors, the transformer design is best finalized using a computer simulation.

DESCRIPTION OF THE INVENTION

Figure 1:
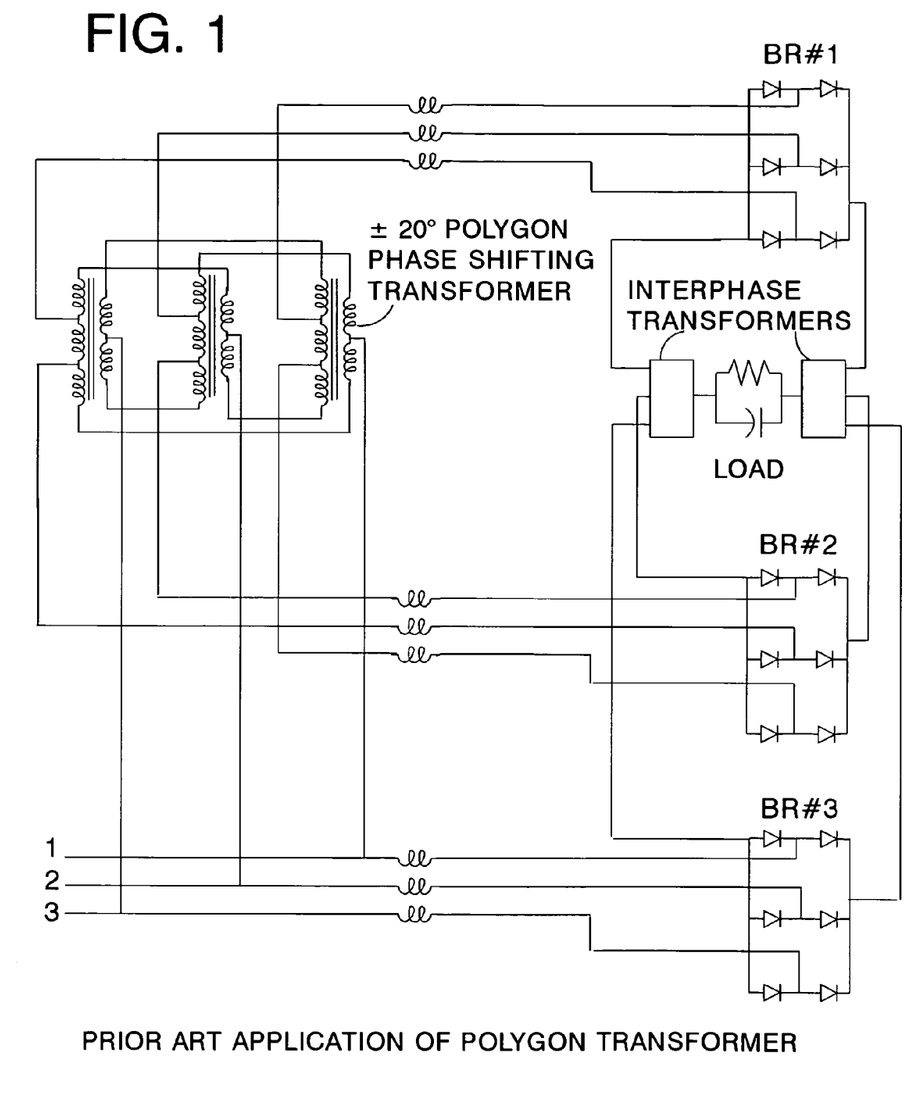
FIG. 1 shows the prior art of U.S. Pat. No. 4,876,634, in which a polygon transformer illustratively provides three balanced sets of three-phase voltage phase shifted by an angle of nominally ±20° to power three converter bridges, namely, BR#1, BR#2, and BR#3. Appropriate interphase transformers prevent circulating currents and combine the output of the DC load, which in the example includes a filter capacitor. Other DC filter components may be included.
Figure 2:
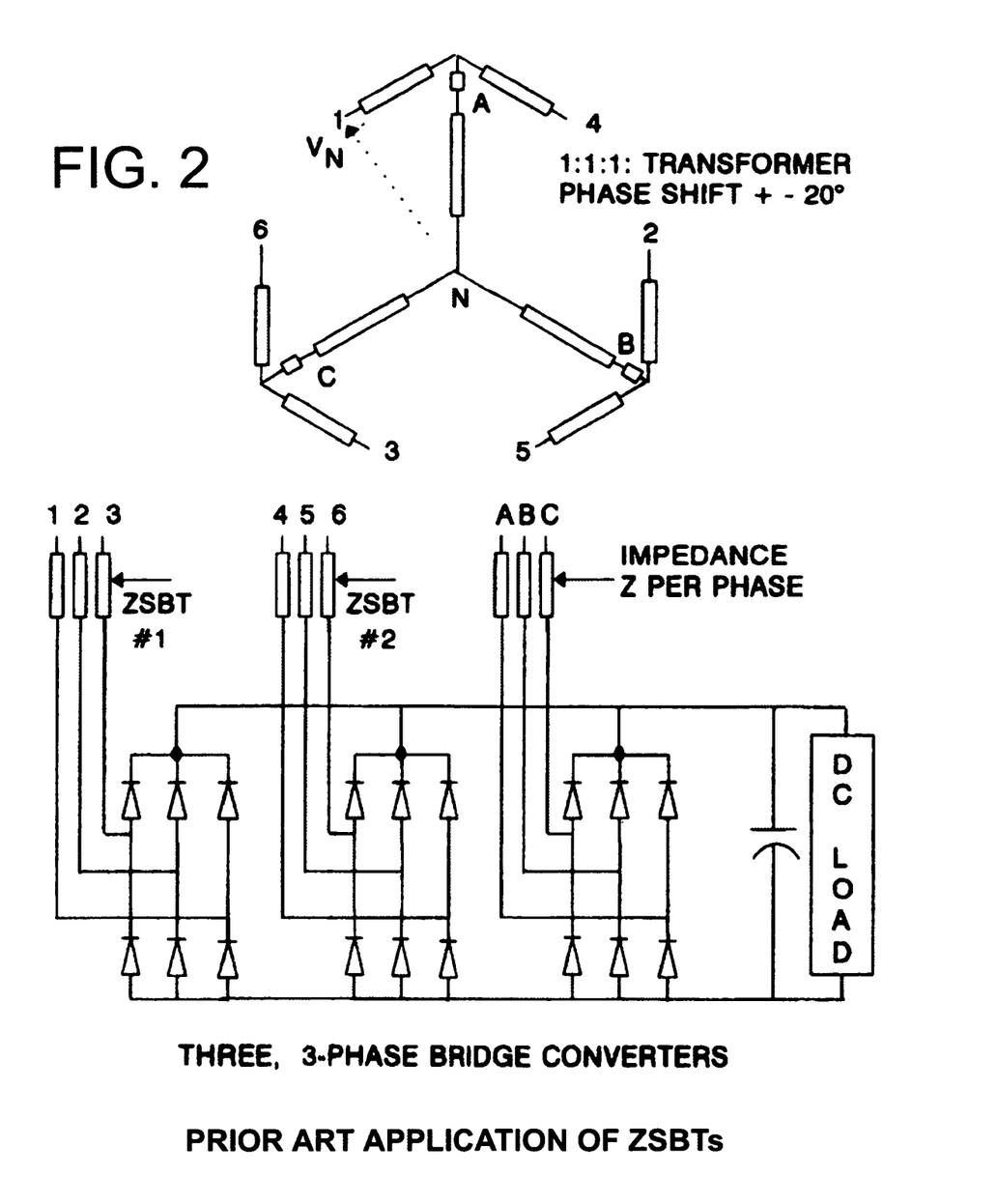
Figure 3:
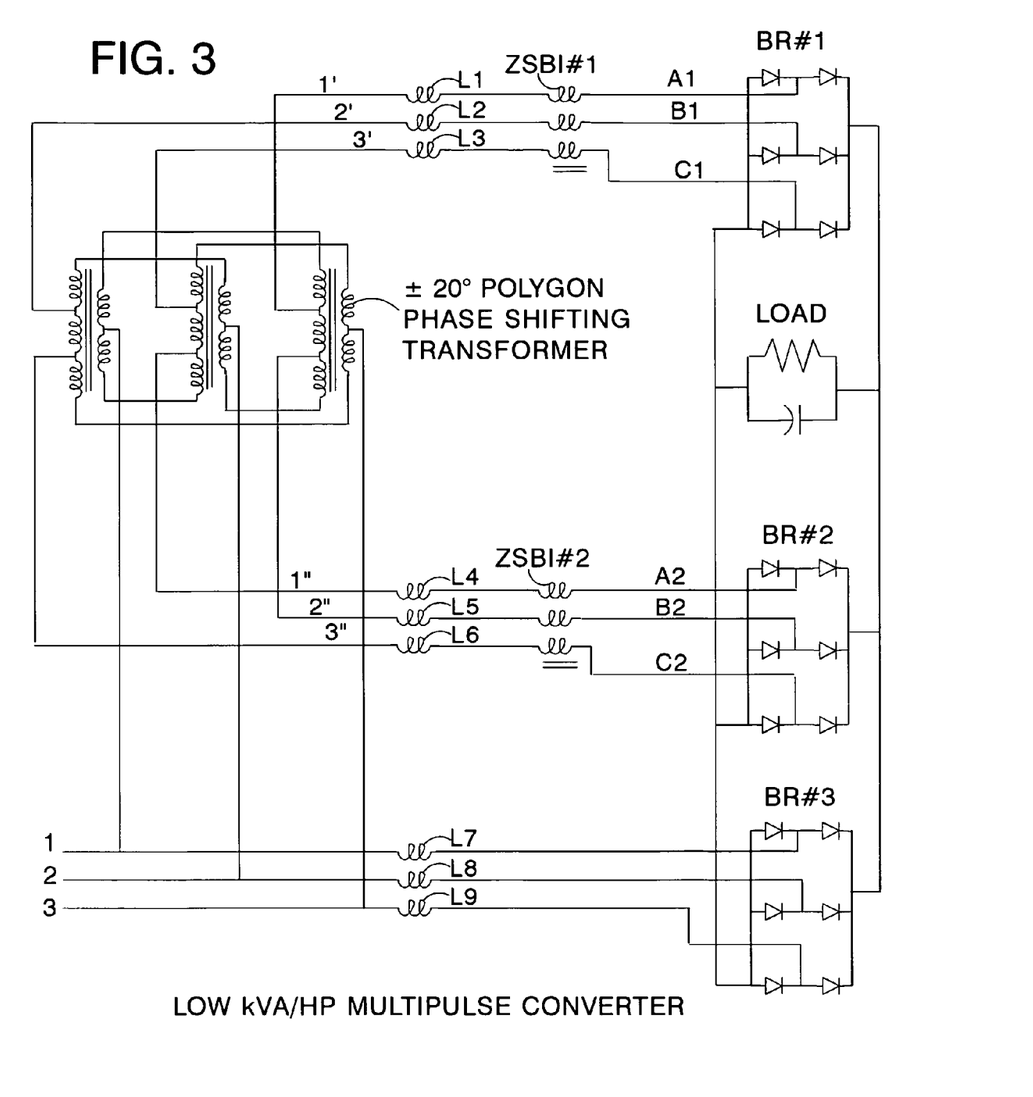

The essence of the invention lies in the combination of a polygon transformer, zero sequence blocking inductors, and AC output line reactors. FIG. 3 gives an illustrative schematic of the invention applied to an 18-pulse converter. Also, additional coils on the polygon are suggested for certain types of load.

Figure 4:
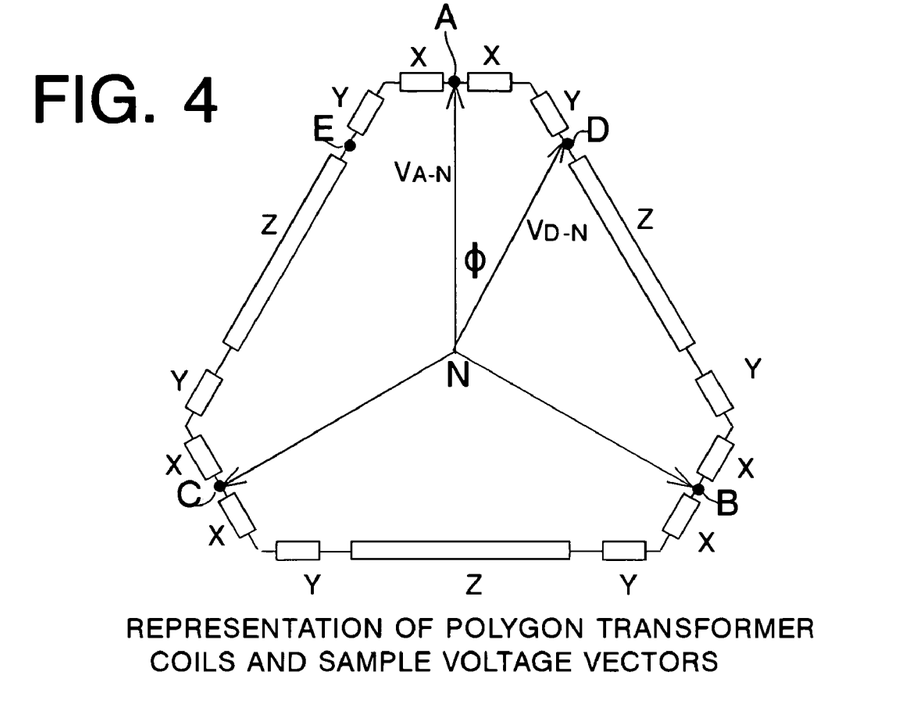
FIG. 4 provides a coil/vector representation than enables voltages available from the polygon transformer to be calculated, also phase displacement angles such as $\phi$, $\phi_1$ and $\phi_2$. A three-phase voltage is applied to terminals A, B, and C. Coils on the three phases of the transformer are represented by rectangles. Transformer turns are illustratively represented by X, Y, and Z in the upper figure. Additional coils, X1, X2, Y1, and Y2, are shown in the lower figure. Point N is a virtual ground connection that facilitates calculations of input and output voltages. In the upper figure, terminals A, D and E illustrate possible output connection points for one of the phases. Additional coils shown in the lower figure allow output to be obtained, or inputs to be applied, at A, A1, A2, A3 and A4. These additional terminals expand the range of phase-shifted outputs that can be obtained.
Figure 5:
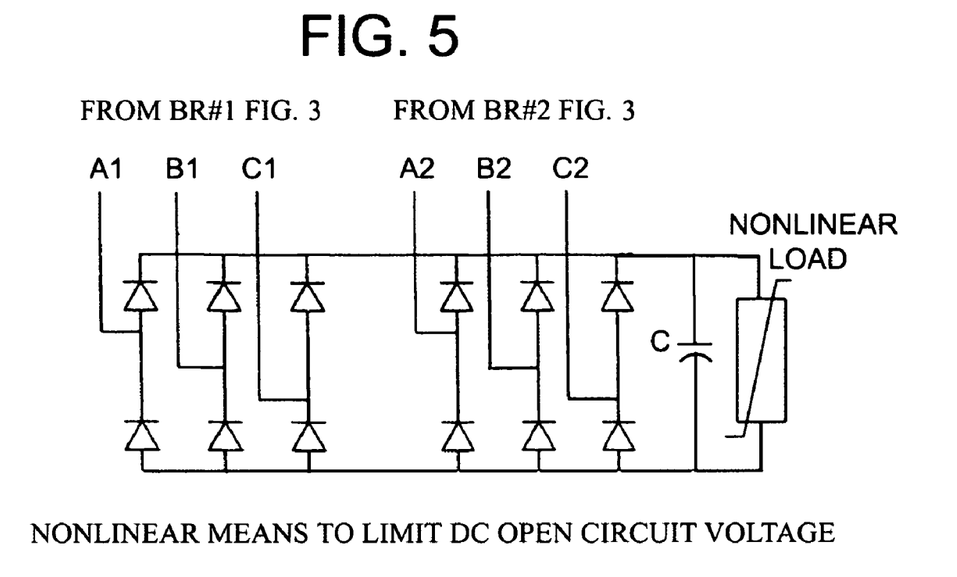

Referring to FIG. 4, a three-phase unity amplitude voltage is here considered to be applied to terminals A, B, C. The resulting voltages across turns X, Y, and Z are proportional to the turns, thus the voltage across X turns is X, the voltage across Y turns is Y, and so on. Applying the vector algebra to FIG. 4, we get:

$$V_{D-N} = 1\angle 0° + X\angle -90° + Y\angle -150°$$

Thus: $V_{D-N} = (1+j0) + (X\cos-90°+jX\sin-90°) + (Y\cos-150°+jY\sin-150°)$

Real part of $V_{D-N} = 1 + 0X - 0.866Y$

Imaginary part of $V_{D-N} = 0 - 1X - 0.5Y$

If the required amplitude value of $V_{D-N}$ is equal to V1, namely unity, and the phase shift required is $-\phi°$, then we can solve the equations to determine, X, Y, and Z in the following manner:

In phase component 1 cos$-\phi°=1-0.866Y$ from which: $Y=1.1547(1-\cos \phi°)$, also, Imaginary component 1 sin$-\phi°=-X-0.5Y$ from which: $X=\sin \phi°-0.577(1-\cos \phi°)$ Similarly: $Z=1\angle(-120+\phi°)-1\angle-\phi°$ Some possible values of practical interest are listed in table 1.

TABLE 1

Idealized voltages across polygon transformer coils for an output line-neutral voltage equal to an input line-to-neutral voltage of unity.

| Phase shift- degrees | X | Y | Z |
|---|---|---|---|
| 15 | 0.2392 | 0.0393 | 1.414 |
| 20 | 0.3072 | 0.0693 | 1.2855 |
| 40 | 0.5077 | 0.27 | 0.684 |
| 60 | 0.577 | 0.577 | 0 |

As an example of using table 1, if the line-to-neutral input and output voltages are say 277 volts, then the voltage across the X coil will be 85.09 volts for a phase shift of 20°.

For those skilled in the art, it is clear that the polygon transformer can provide many useful variations in output and phase angles. FIG. 4 shows an expanded view that illustrates some of the possibilities. Outputs such as $V_{A1-N}$, $V_{A2-N}$, $A_{3-N}$ and $A_{4-N}$ are obtainable.

Figure 8:
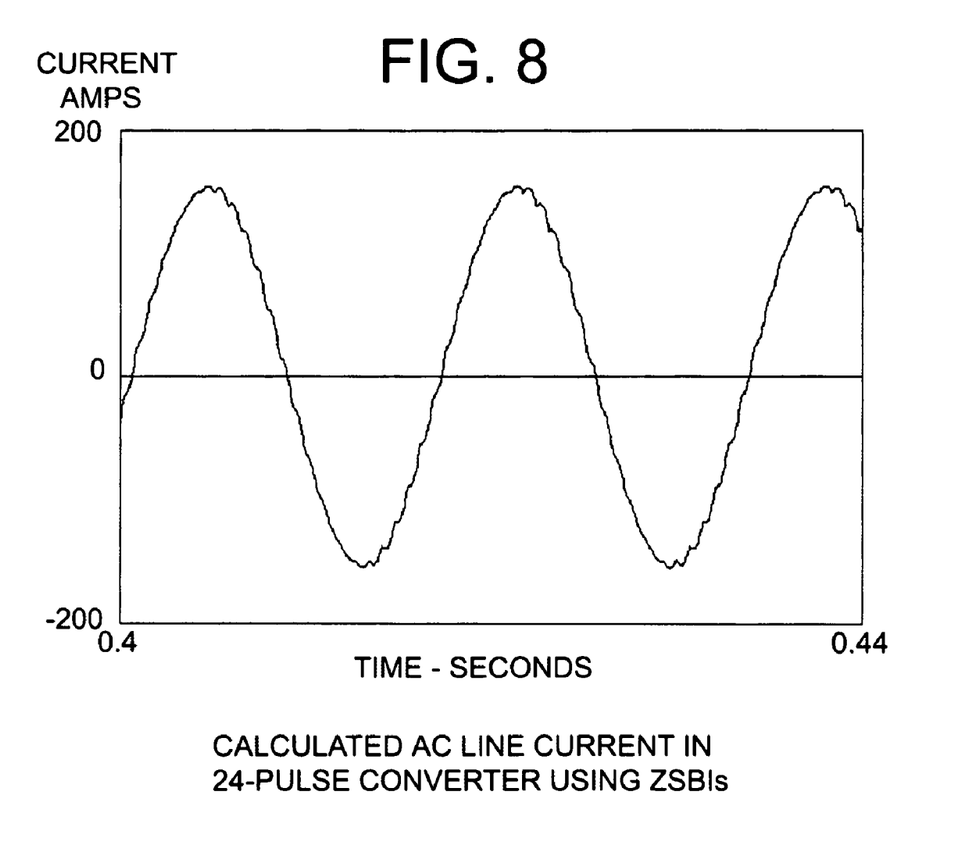
FIG. 8 shows the calculated AC line current waveform for a practical 24-pulse converter incorporating the polygon transformer and practical ZSBIs of the invention.
Figure 9:
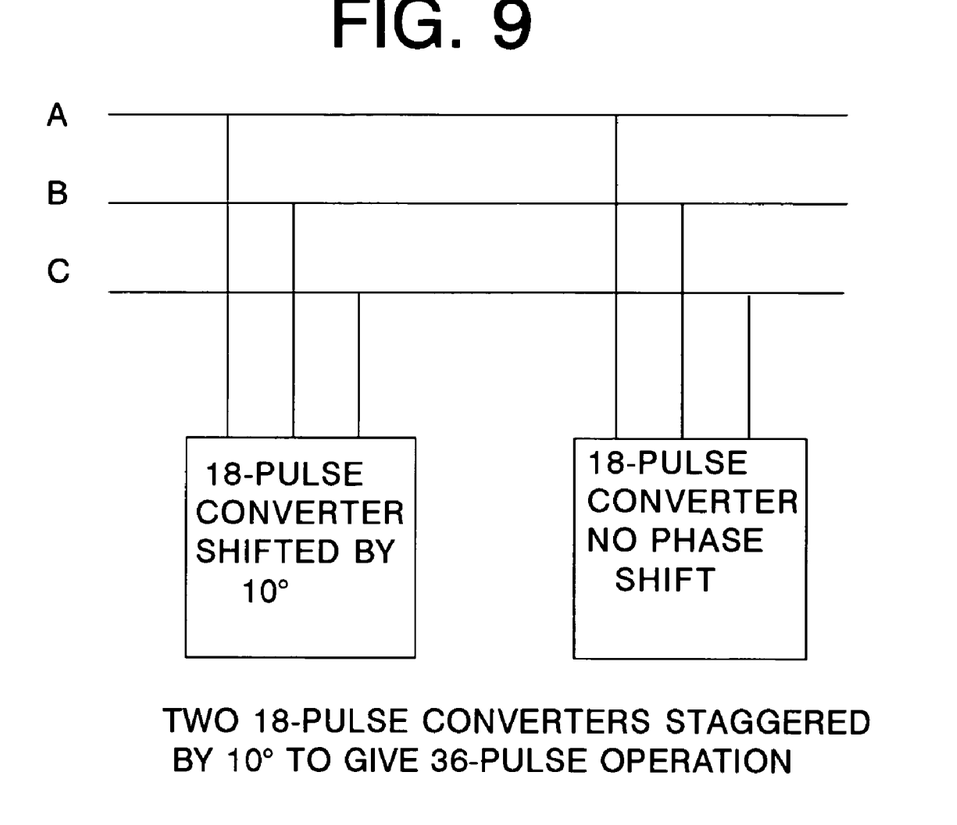
FIG. 9 shows how two multipulse converters on a power system can be staggered to give improved overall system performance. The method can be applied universally to various numbers and types of multipulse converters.
Figure 10:
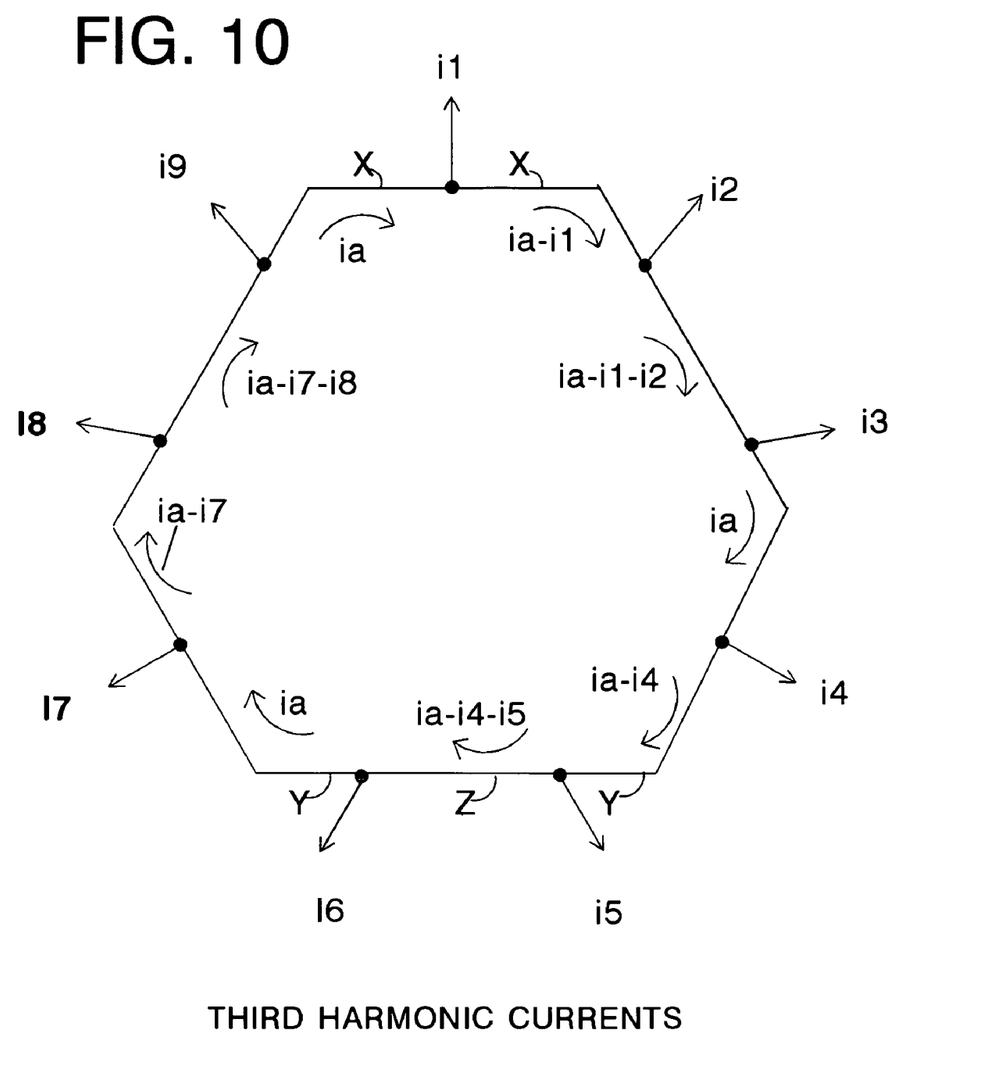
FIG. 10 shows third harmonic currents that circulate around the polygon when the transformer is used to supply loads incorporating significant third harmonic current. Turns, X, Y, and Z represent turns on one phase of the transformer. Third harmonic load currents numbered i1 through i9 are of special concern when the polygon structure is used to provide a nominal 40° phase shift, as is the case for the 18-pulse converter described in U.S. Pat. No. 6,335,872.
Figure 11:
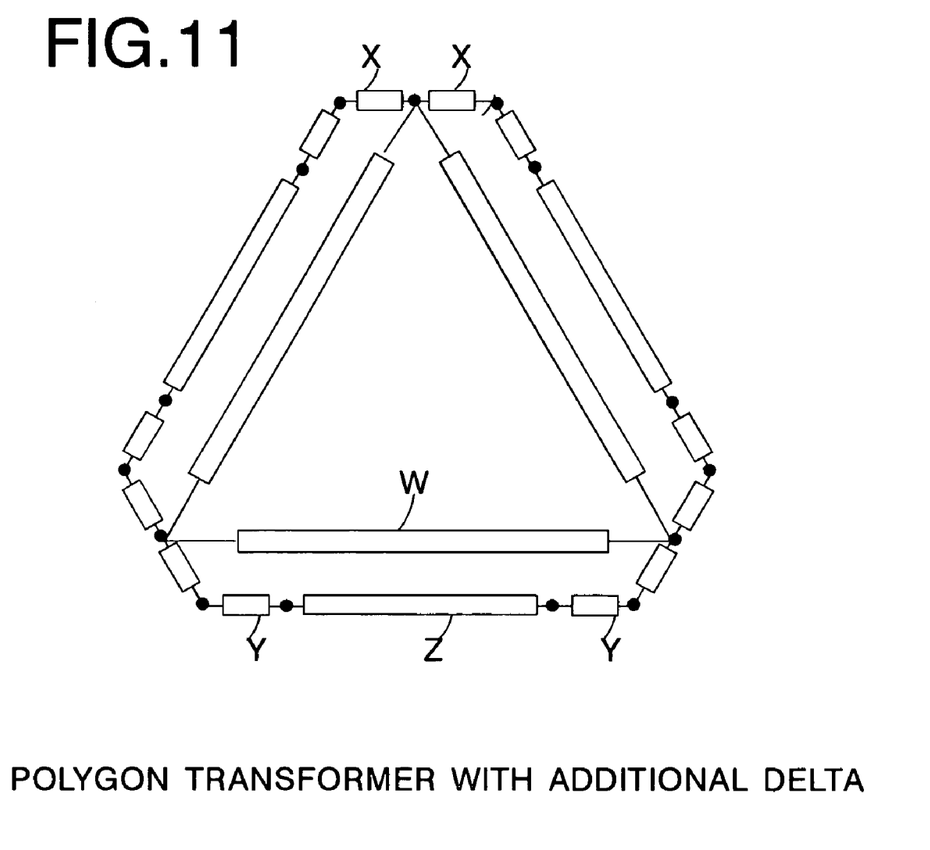

As an example, a 24-pulse converter requires a phase shift of 15° from four equal amplitude voltage sets. Referring to the expanded view given in FIG. 4, this can be obtained with X1=0.1365, X2=0.2148, Y1=0.0787, Y2=0, and Z=1.228. In this case $\phi_1=7.5°$ and $\phi_2=15°$. With these ratios, the output voltage is negligibly higher than the input voltage (1.00863 times) and the transformer kVA rating is less than 11% that of the load kW. A practical example of the converter AC line current calculated for this arrangement is shown in FIG. 8.

Figure 6:
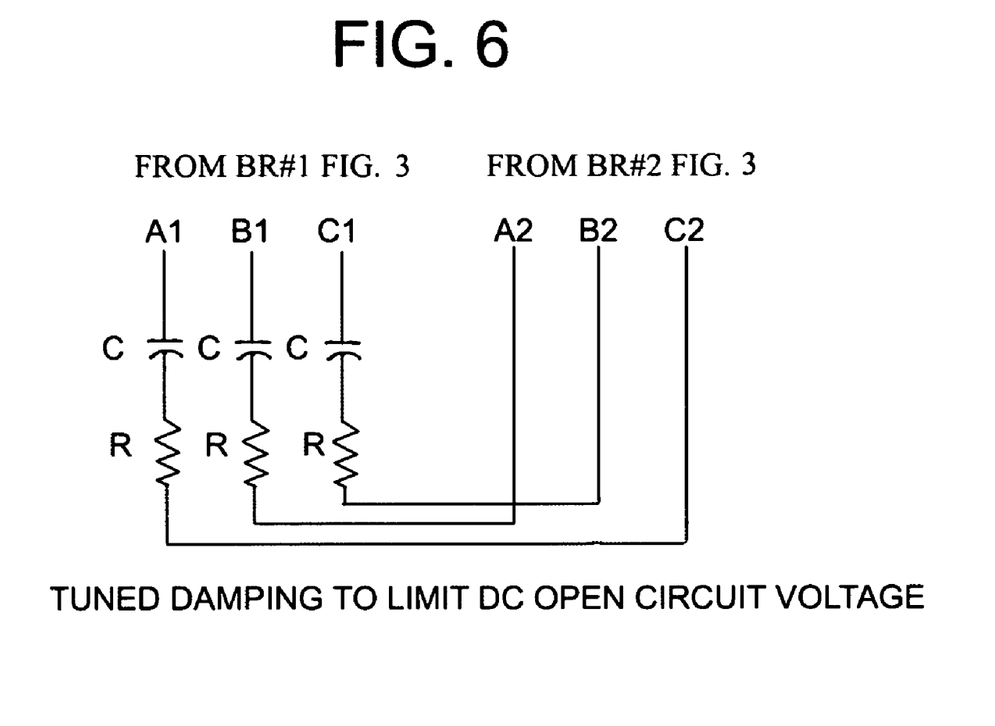
FIG. 6 illustrates resistor-capacitor networks connected between terminals A1 and A2, B1 and B2, C1 and C2 of the converter shown in FIG. 3. The resistor-capacitor networks tune the ZSBIs such that they present an even greater impedance at light loads. By this means the required minimum load to limit the converter DC output is less than 0.15% of the converter rating, a trivial amount.
Figure 7:
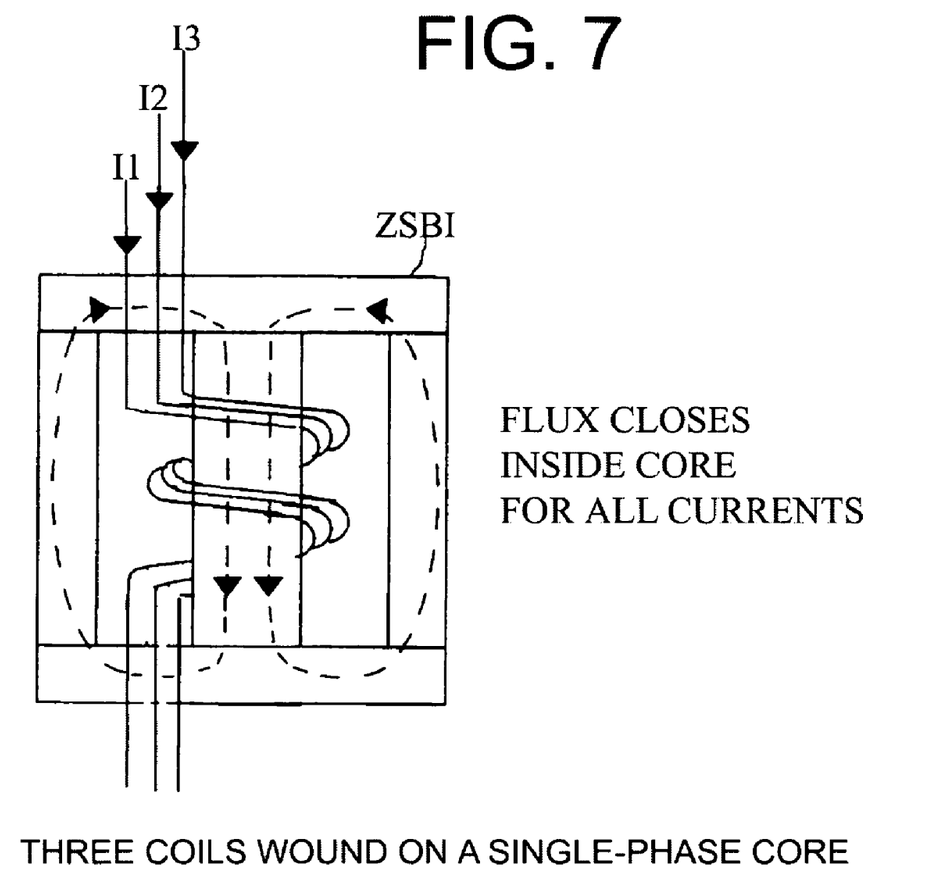
FIG. 7 illustrates the construction of a ZSBI using a single-phase magnetic core. Currents I1, I2, and I3 come from a set of AC lines feeding one of the bridges, such as BR#1 in FIG. 3.

The ZSBIs incorporated in FIG. 3 consist of three identical coils wound on a single phase core as shown in FIG. 7. The higher the magnetizing inductance at low current, the smaller is the minimum DC load required to restrict the converter open circuit DC voltage. The tuned damping network shown in FIG. 6 provides a means whereby the third harmonic impedance presented by the ZSBI can be substantially increased.

OBJECT OF THE INVENTION

The object of the invention is to produce a multipulse converter using an autotransformer with small power rating relative to the DC load. A further objective is to facilitate the use of lower grade, lower cost transformer steel.

The mode of operation in the invention does not cause a large third harmonic current to circulate in the coils of the transformer. Also, since the basic output current conduction interval is 120°, a favorable ratio of rms to DC current is achieved.

AC line inductors in the output leads of the transformer enable transformer leakage reactance to be augmented and/or balanced such that any residual currents circulating around the converter bridges will be small. These inductors also reduce distortion of the transformer voltage and make it easier to apply a lower grade of transformer steel.

For an 18-pulse converter, the invention shown in FIG. 3 requires a polygon autotransformer with a rating that is only about 21% that of the polygon autotransformer described in U.S. Pat. No. 6,335,872.

An improvement is disclosed that facilitates reduction in size of the polygon transformer when it is used to supply loads containing substantial third harmonic current, as in the case of an 18-pulse converter using nominally 40° current conduction.

I claim:

1. A multipulse AC to DC converter system comprising a three-phase regular polygon auto-connected transformer having at least five coils on each phase; with at least three coils combining to produce a long side of the polygon; with at least two coils with a center tap combining to produce a short side of the polygon; with alternate long and short sides of each of three phases being serially connected with other phases to form a three-phase polygon magnetic circuit structure; with three symmetrically disposed points of connection to said coils on each phase each being connected to one of three input phases; with said symmetrical points including the center of the short sides of the polygon; with the points of interconnection of each coil providing junctures such that m three-phase output voltage sets each displaced by 120 phase are available, with some of said voltage sets having a phase shift relative to the three-phase power source; with such phase shift being determined by the number of coils and relative number of turns on each coil; with the phase shift being suitable for powering multiple three-phase converters in a manner to provide DC output with reduced ripple voltage and reduced harmonic current from the three-phase AC supply; with nominal phase shifts including, but not limited to, ±7.5°, ±15°, ±20°, ±22.5°, ±30°, ±40°, ±60°; with inductors connected in series with output leads of the transformer as necessary to balance and/or augment the inherent transformer leakage inductance in a manner to reduce possible circulating currents and increase the current conduction angle of the current flowing in each output lead; with such combinations of m phase-shifted sets of three-phase voltage being suitable to power m three-phase converters comprising controlled or uncontrolled rectifier devices to produce an AC to DC converter with reduced output voltage ripple and low harmonic content.

2. The system of claim 1 wherein each current associated with the three voltages of at least m−1 three-phase voltage sets flows through three electrically isolated coils on a separate single-phase transformer magnetic core; where such isolated coils are generally equal in turns so as to block third harmonic currents and multiples thereof; whereby three-phase power supplies are available to power m three-phase converters in a manner that reduces the possibility of circulating currents and reduces the harmonic content of the currents drawn from the transformer.

3. The system of claim 1 with an additional coil on each phase with the ends of said additional coil being connected to the center tap of the coils on the short side of the polygon so as to form a triangle; with said additional coil being selected to minimize fundamental frequency circulating current; with said additional coil being capable of extension beyond the center tap so that tapping points on said additional coil allow for voltages greater or less than the voltage present at the center tap of the coils on the short side of the polygon.

4. The system of claim 1 wherein each inductor may be a separate single-phase structure or three-phase structures or structure with a number of limbs equal to 3m where m is the number of three-phase converter bridges.

5. The system of claim 1 wherein an additional isolated coil or coils on each phase may be used to connect the polygon structure to a three-phase source of primary power such that useful step up or step down of voltages is possible; wherein such primary coils may be configured in a manner to produce an appropriate phase shift to further reduce the harmonics currents drawn from the power system by multiple multipulse converters; wherein such primary coils may include an extended delta or delta connection.

6. The system of claim 2 wherein tuning components consisting of a series connected capacitor and resistor are connected across the converter terminals in a manner to increase the third harmonic impedance presented by the three electrically isolated coils on a separate single-phase magnetic core.

7. The system of claim 2 wherein an auxiliary load consisting of (m−1) low power three-phase rectifiers is connected across the AC output terminals feeding the main converter consisting of m three-phase converters; with the load of such auxiliary rectifier comprising nonlinear or linear load such as to limit the DC open circuit voltage of the main converter.

8. The system of claim 2 wherein the three-phase AC outputs supplying (m−1) three-phase bridge converters are disabled at light load current so as to limit the DC open circuit voltage of the three-phase bridge converters.

* * * * *